US007716710B1

(12) United States Patent
Everson et al.

(10) Patent No.: US 7,716,710 B1
(45) Date of Patent: May 11, 2010

(54) MANAGED COOPERATIVE DOWNLOADING OF DIGITAL CINEMA CONTENT

(75) Inventors: John M. Everson, Leawood, KS (US); Lyle T. Bertz, Lee's Summit, MO (US); Frederick C. Rogers, Olathe, KS (US); James W. Norris, Kansas City, MO (US); Jarrod A. Nichols, Olathe, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 357 days.

(21) Appl. No.: 11/748,145

(22) Filed: May 14, 2007

(51) Int. Cl.
*G06F 15/16* (2006.01)
*G06F 17/30* (2006.01)
*H04N 7/173* (2006.01)
(52) U.S. Cl. .................. 725/110; 707/10; 725/109; 709/217
(58) Field of Classification Search .............. 707/10; 709/217
See application file for complete search history.

(56) References Cited

U.S. PATENT DOCUMENTS

| 6,735,776 | B1 * | 5/2004 | Legate ................... 725/25 |
| 7,257,309 | B1 * | 8/2007 | Elswick et al. ............ 386/46 |
| 2005/0125831 | A1 * | 6/2005 | Blanchard ............... 725/81 |
| 2005/0213514 | A1 * | 9/2005 | Su et al. ................ 370/254 |
| 2008/0062988 | A1 * | 3/2008 | Daigle .................. 370/392 |
| 2008/0133538 | A1 * | 6/2008 | Chavez et al. ............ 707/10 |

OTHER PUBLICATIONS

Chokkalingam, Arun, and Firasath Riyaz. "BitTorrent Protocol Specification V 1.0." Dec. 12, 2004. Web. Dec. 3, 2009. <http://cs.ecs.baylor.edu/~donahoo/classes/5321/projects/bittorrent/BitTorrent%20Protocol%20Specification.doc>.*
Digital Cinema Initiatives, LLC. "Digital Cinema System Specification." Apr. 12, 2007. Web. Dec. 17, 2009. <http://www.dcimovies.com/archives/spec_v1_1/>.*

* cited by examiner

*Primary Examiner*—Christopher Kelley
*Assistant Examiner*—Randy Flynn (57) ABSTRACT

A method for distributing a digital motion picture to multiple theaters in a region via terrestrial wireless communication. The motion picture is divided into chunks, and the chunks are transmitted to particular initial seed theaters in the region. To facilitate the initial seeding, downlink bandwidth on various wireless links is dynamically increased. Once the initial seeding is complete, the downlink bandwidth is decreased and is preferably equalized substantially with uplink bandwidth. The theaters in the region are then directed to begin peer-to-peer sharing of the chunks with each other, possibly through use of BitTorrent or other cooperative downloading process from the initial seed theaters. Ultimately, all of the theaters in the region thereby obtain all of the chunks of the motion picture and can conveniently present the motion picture to audiences.

17 Claims, 4 Drawing Sheets

FIG. 4 ured as a set of 3-5 large reels of film. Once the
MANAGED COOPERATIVE DOWNLOADING OF DIGITAL CINEMA CONTENT

FIELD OF THE INVENTION

The present invention relates to delivery of digital cinema content to theaters and, more particularly, to delivery of digital cinema content through cooperative downloading and terrestrial wireless communication.

BACKGROUND

Traditionally, motion pictures have been distributed to movie theaters in the form of multiple expensive and bulky film reels. In practice, for instance, a typical motion picture would be structstudio and post-production houses complete production of the motion picture, one or more distributors would deliver the set of reels by courier to each and every theater that will be showing the motion picture. At each theater, a projection mechanic would then splice the reels together and feed the film into a projector. Furthermore, in typical practice, a given set of film reels lasts for only a limited number of showings before the film gets worn and is then discarded or replaced. Consequently, after a certain number of showings, a new set of the bulky and expensive film reels may need to be delivered by courier to the theater and again prepared for showing. Overall, the process of distributing motion pictures to theaters has been expensive and cumbersome.

In recent years, significant advances have occurred in video technology. The advent of high definition television and digital video (e.g., digital cable and satellite), as well as new forms of digital video projection, has given consumers a taste for drastically improved video quality. Further, cable, satellite, and other network communications have ushered in a new era of video distribution.

Recognizing the expensive and burdensome nature of traditional motion picture delivery, the motion picture industry is currently transitioning from film cinema to digital cinema. In particular, rather than (or in addition to) producing and distributing a motion picture on a set of bulky film reels, many studios, post-production houses, and movie distribution organizations are beginning to produce and distribute motion pictures digitally.

In practice today, a digital motion picture is delivered to theaters in encrypted form on computer hard drives. In particular, the motion picture may be stored on a hard drive as a set of encrypted files (sometimes still called "reels") each comprising a portion of the motion picture, and each theater may be equipped with a computer or media player to which the hard drive can be connected as well as a digital video projector (e.g. a DLP projector) suitable for projecting the video content onto a large theater screen. For a given motion picture, the distributor would thus deliver a copy of the hard drive to each theater that will be digitally presenting the motion picture. Further, each theater would be provided with decryption keys for decrypting the encrypted video files, to facilitate presentation for an allowed number of times or period of time for instance.

Beneficially, delivering motion pictures on hard drives rather than as traditional film reels can greatly reduce the costs and burden of the process, and presents numerous other advantages. From the production and distribution standpoint, the act of loading digital cinema onto multiple hard drives is much simpler and less expensive than producing multiple copies of a set of film reels. Further, a hard drive is much smaller and lighter weight than a set of film reels, and so courier delivery of the motion picture to theaters is far less expensive. Still further, through use of established and developing digital rights management techniques, digital cinema distributors can maintain control over the extent to which the digital cinema is used after distribution.

From the standpoint of theater owners, maintenance is greatly simplified. Once a hard drive containing a motion picture is connected with the theater presentation system, the presentation of the motion picture can be substantially or entirely automated, as can other aspects of motion picture management. Further, the theater owner benefits by not having to replace the motion picture after numerous showings, as the quality of digital cinema remains the same no matter how many times it is played. In addition, the theater owner benefits by not having to maintain sometimes archaic projection equipment. Other than the possibly substantial expense of initially equipping a theater for digital presentation, theater owners should also see greatly decreased cost and increased revenue by attracting consumers with higher quality video presentation.

The industry is also currently experimenting with delivering digital cinema content to theaters through satellite transmission. To do so, each theater would be equipped with one or more satellite dishes, and the motion picture distributor would work with satellite communication companies to arrange for transmission of the motion picture content to satellites and then down to the theaters, where the content would be stored for playout.

Several problems exist with satellite transmission of digital cinema, however. First, satellite transmission suffers from limited bandwidth, in some cases capping at approximately 45 megabits per second, which means that it can take a very long time to transmit a large motion picture file (on the order of 200 or 300 gigabytes) to a theater. Second, the satellite dishes that would be used for satellite transmission of digital cinema may be large 6 foot wide dishes, which can take up substantial physical space at the theater. In some cases, for instance, a digitally-equipped theater would need multiple such dishes to receive content from multiple distributors, through multiple satellite distribution systems. For example, the theater may need one dish for receiving pre-show content such as advertisements and previews from one distributor, another dish for receiving live broadcasts (e.g., concerts or the like), and another dish for receiving digital motion pictures. Still further, a given type of content may be distributed by multiple distributors, which could further increase the number of satellite dishes at each theater.

Consequently, an improvement is desired.

SUMMARY

The present invention is directed to a method and system for improved distribution of digital cinema content from motion picture studios, post-production houses, and movie distribution organizations to theaters. In accordance with an exemplary embodiment of the invention, a motion picture will be delivered to multiple theaters through terrestrial wireless communication and a cooperative downloading process such as BitTorrent.

In particular, the motion picture will be divided into chunks, and the chunks will be transmitted to particular initial seed theaters in the region. To facilitate the initial seeding, downlink bandwidth on various wireless links may be dynamically increased. Once the initial seeding is complete, the downlink bandwidth may then be decreased and is preferably equalized substantially with uplink bandwidth to optimize cooperative file transfers. The theaters in the region may then be directed to begin peer-to-peer sharing of the chunks with each other, possibly through use of BitTorrent or other cooperative downloading process from the initial seed theaters. Ultimately, all of the theaters in the region will thereby obtain all of the chunks of the motion picture and reassemble the motion picture package for presentation to audiences.

These as well as other aspects will become apparent to those of ordinary skill in the art by reading the following detailed description with reference where appropriate to the accompanying drawings.

DETAILED DESCRIPTION

As presently envisioned, each of multiple theaters in a region will be equipped with a wireless transceiver suitable for communicating with a terrestrial high data rate wireless network, through point-to-point microwave or millimeter-wave communication for instance. Further, each theater will be equipped with a media agent that will function to manage download of digital cinema via the wireless transceiver to the theater. An operator of the terrestrial wireless network may then function as a digital cinema distributor and may operate a media controller that will manage (i) operation of the media agents at the various theaters and (ii) operation of various aspects of the wireless network, to facilitate end-to-end transmission of digital cinema content to the theaters through cooperative downloading.

Figure 1:
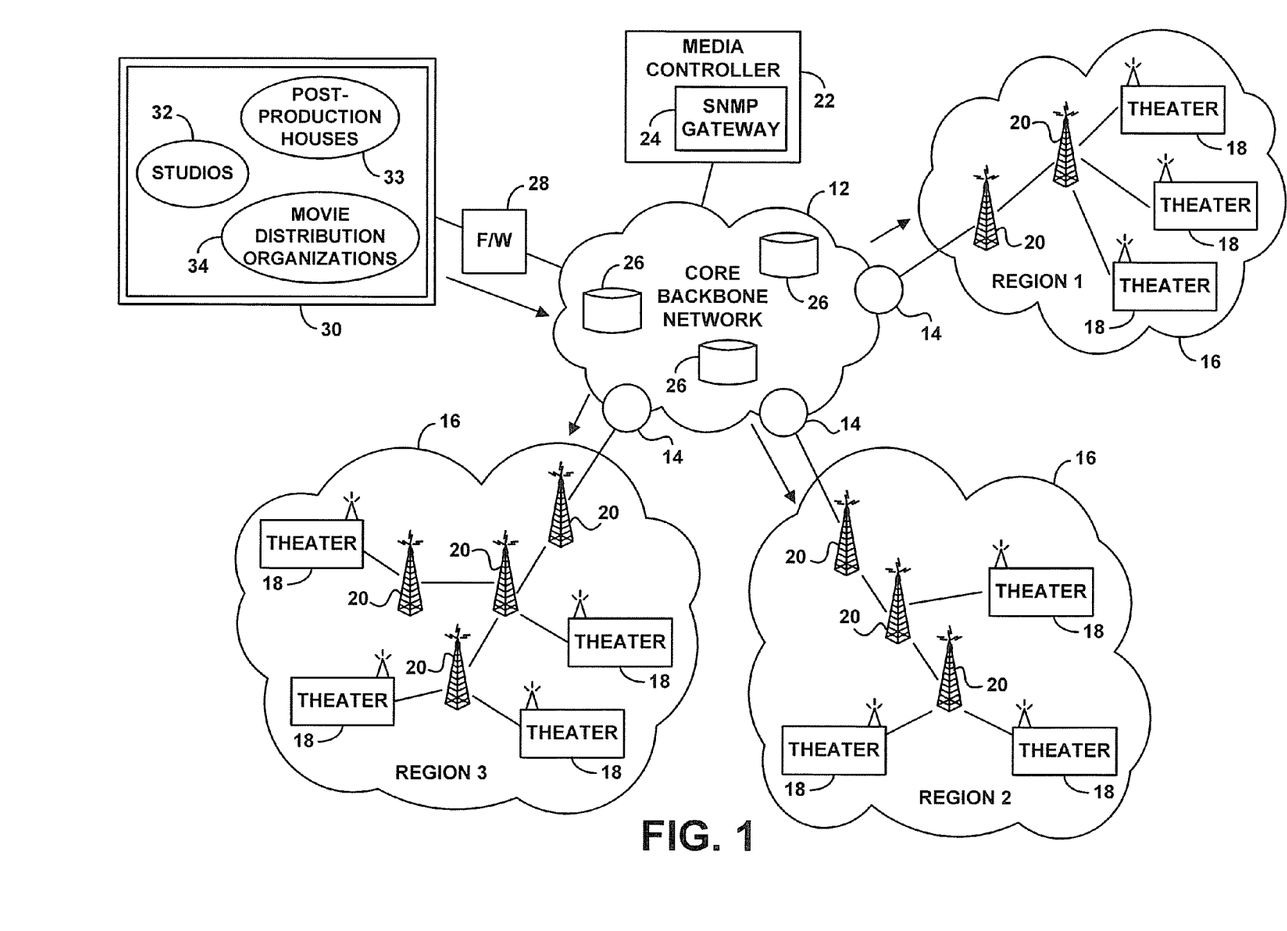
FIG. 1 is a simplified block diagram of a network in which an exemplary embodiment of the invention can be implemented.

Referring to the drawings, FIG. 1 is a simplified block diagram depicting a network arrangement in which an exemplary embodiment of the invention can be implemented. It should be understood, of course, that this and other arrangements and functions described herein are provided by way of example only and that numerous variations may be possible. For instance, elements can be added, omitted, combined, distributed, reordered, repositioned, or otherwise changed while remaining within the scope of the invention as defined by the claims. Further, it should be understood that various functions described herein can be carried out by hardware, firmware, and/or software (e.g., one or more processors programmed with machine language instructions to carry out the functions).

In practice, as shown in FIG. 1, the wireless service provider may operate a core packet-data network 12 functioning as a backbone network to facilitate distribution of data to various geographic regions. The service provider's core network may function as a transport and signaling network for various purposes, such as to carry digitized call traffic and associated signaling between local serving systems and gateways to the public switched telephone network, the Internet, or other networks now known or later developed. The service provider's core network may in fact comprise a virtual network superimposed over another network such as the Internet. Other arrangements are possible as well.

Sitting as nodes on the core network at various geographic locations may then be edge routers 14 that provide connectivity with (or sit on) one or more wireless networks 16, and each wireless network may in turn provide connectivity with wireless transceivers at multiple theaters 18 in the region. For instance, as shown by way of example, each geographic region of the United States may include a respective wireless network 16 that provides connectivity between the core network and theater transceivers in the region.

As a general matter, each wireless network will facilitate communication with client devices such as theater transceivers through high data rate terrestrial wireless communication, contrasted with slower satellite wireless communication for instance—although the wireless network can theoretically include non-terrestrial (e.g., satellite) and/or wireline links (e.g., fiber, cable, data over power line, etc.) as well.

In a preferred embodiment, for instance, each wireless network may include a plurality of intelligent radio nodes 20 mounted on antenna towers or the like and paired with each other through point-to-point microwave or millimeter-wave communication. Each edge router 14 of the core network may include or be connected with one or more of those radio nodes, and each theater transceiver 18 may comprise a corresponding radio node (e.g., roof mounted) arranged to engage in point-to-point microwave or millimeter wave communication with one or more radio nodes of the wireless network.

The radio nodes of the wireless network preferably form a wireless mesh network that provides various high data rate terrestrial wireless links through which bearer and signaling traffic can flow between the core network and each theater transceiver. For instance, traffic may flow from an edge router of the core network to a radio node, from that radio node over a microwave or millimeter wave link to another radio node, from the other radio node over a microwave or millimeter wave link to yet another radio node, and so forth, until the traffic passes over a "last mile" microwave or millimeter wave link to the theater transceiver to which the traffic is destined. (As noted above, one or more links within the mesh network may take other forms as well, such as wireline or non-terrestrial wireless links.) Advantageously with this mesh network arrangement, the theater transceivers 18 can also readily engage in communication with each other, to facilitate the present cooperative downloading process.

In a presently preferred embodiment, the radio links between the various nodes of the mesh network will be particularly high bandwidth links, such as gigabit (or larger) microwave links (i.e., microwave links theoretically supporting transmission of data at up to a gigabit per second). The radio link providing the last mile connection with each theater transceiver can also be a gigabit link, but a smaller last mile link (e.g., 400 megabit or so) would be acceptable. Of course, these particular bandwidth preferences are not intended to be limiting; the terrestrial wireless links could support any desired bandwidth.

It should also be understood that the particular wireless network arrangements shown in FIG. 1 are exemplary only, and that numerous other wireless network configurations and protocols could be used instead.

For example, rather than or in addition to providing point-to-point microwave or millimeter wave links between the various radio nodes, the wireless network may provide one or more cellular wireless links between the various radio nodes. Such links may be compliant with a cellular wireless protocol such as CDMA, TDMA, WiMAX, GSM, GRPS, UMTS, EDGE, LTE, or others now known or later developed. Preferably, the cellular links will support high data rate communication. For instance, the cellular links could comprise EIA/TIA/IS-856 Rel. 0 or A (e.g., 1xEV-DO Rev. 0 or Rev. A) links and/or Gigabit WiMAX links (e.g., IEEE 802.16m links).

Cellular wireless communication may be provided by a radio access network (RAN) comprising a base transceiver station (BTS), radio network controller (RNC) controlling the BTS, and a packet data serving node (PDSN)—perhaps one of the edge routers 14—providing connectivity with the core network 12. Further, a RAN may include distributed antenna systems and/or wireless backhaul components to extend coverage to remote locations.

Shown sitting as a node on the core network 12 in FIG. 1 is a media controller 22, which may be owned and operated by the wireless service provider, and which preferably includes a server or gateway function 24 compliant with a management protocol such as Simple Network Management Protocol (SNMP) or Common Management Information Protocol (CMIP), for instance. Further, distributed through the core network 12 are a plurality of databases 26, also owned and operated by the wireless service provider. Shown coupled with the core network 12 through a firewall 28 or other gateway is then a motion picture origination system 30, which preferably includes motion picture studios 32, post-production houses 33, and movie distribution organizations 34.

In general operation, once the motion picture origination system 30 creates a digital motion picture for distribution to theaters, the motion picture origination system 30 will transmit or otherwise provide the motion picture to the wireless service provider, such as to media controller 22 (or an associated media server). The media controller 22 may then orchestrate distribution of the motion picture to the various databases throughout the network and from there, through the inventive process, out to the various theaters.

Each radio node in the exemplary network preferably includes program logic for controlling wireless communication by the node, such as to control power output, bandwidth usage and the like. Furthermore, each radio node is preferably arranged to be controlled by a central controller, such as media controller 22, through a management protocol such as SNMP or CMIP (using gateway function 24 for instance). Thus, in practice, media controller 22 or another control node may send SNMP or similar commands to various radio nodes to cause the radio nodes to adjust their operation, such as to adjust their power output, bandwidth usage, or the like.

As noted above, the radio nodes in each wireless network preferably operate in pairs to provide wireless links between each other. Generally, in a given pair, one node may function as a master node, and the other may function as a slave node. For mesh network operation, this division of responsibility may not be relevant. In any event, when media controller 22 sends control commands to adjust bandwidth of communication between a given pair of radio nodes, the media controller may send the command to each node, or the media controller may send the command to one of the nodes and that node may forward the command to the other node. The nodes may then comply with the command.

Figure 2:
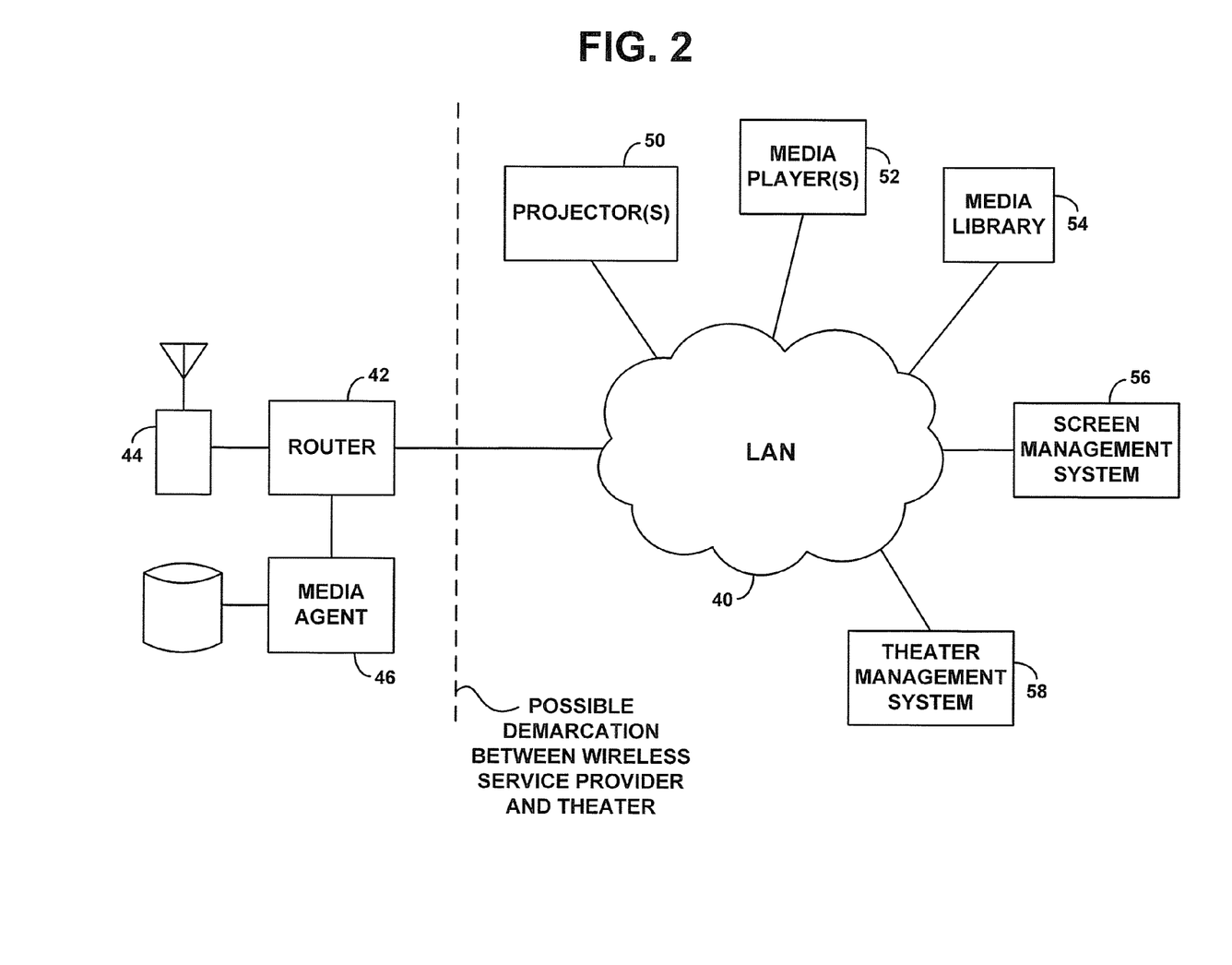
FIG. 2 is a simplified block diagram of an exemplary theater system operable within the exemplary embodiment.

FIG. 2 is a simplified block diagram of a theater management network that may be provided at each theater in accordance with the exemplary embodiment. As shown, each theater may include a local area network (LAN) 40, which connects with distribution components arranged to support the inventive distribution process, and which further connects with various components for managing theater operation.

In terms of distribution components, a router 42 sits on the LAN 40 and provides connectivity with a radio node 44 operable to engage in terrestrial wireless communication with the regional wireless network where the theater resides. Thus, the radio node 44 may be one of the intelligent radio nodes discussed above, arranged to engage in last mile point-to-point microwave or millimeter-wave communication with another radio node of the wireless network. Further, the router 42 connects with a media agent (programmed computer) 46 that functions to manage download of digital cinema content via the radio node 44 to the theater. Media agent 46 preferably includes management client logic such as an SNMP client or CMIP client, and receives management commands from media controller 22 to cause media agent 46 to take various actions. Alternatively or additionally, radio node 44 may receive such commands from media controller 22 as described above.

In terms of theater management components, the LAN connects with one or more digital cinema projectors 50, one or more media players 52, a media library server 54, a screen management system 56 for managing cinema presentation in each auditorium, and a theater management system 58 for managing inventory, screens, concessions, box office listings, and so forth.

In preferred operation, as noted above, the wireless service provider will use a cooperative downloading process such as BitTorrent to deliver a motion picture to each of multiple theaters in a given region. According to the Internet encyclopedia, Wikipedia, "BitTorrent" is a peer-to-peer (P2P) file distribution protocol that defines a method of distributing large amounts of data widely without the original distributor incurring all the costs associated with hardware, hosting, and bandwidth resources. Instead of the distributor alone servicing each recipient, under BitTorrent the recipients each also supply data to newer recipients, thus significantly reducing the cost and burden on any given individual source as well as providing redundancy against system problems, and reducing dependence upon the original distributor.

According to Wikipedia, a "BitTorrent client" is any program that implements the BitTorrent protocol. Each client is capable of preparing, requesting, and transmitting any type of computer file over a network, using the protocol, and a peer is any computer running an instance of a client. To share a file or group of files, a peer first creates a "torrent," which is a small file containing metadata about the files to be shared, and about the "tracker," the computer that coordinates the file distribution. Peers that want to download the file first obtain a torrent file for it, and then connect to the specified tracker which tells them from which other peers to download the pieces of the file.

The peer distributing the file breaks it down into a number of identically-sized pieces, typically between 64 kB and 1 MB each. Pieces over 512 kB are used to reduce the size of torrent files for very large payloads, but also reduce the efficiency of the protocol. The peer creates a checksum for each piece, using a hashing algorithm, and records it in the torrent file. When a peer receives the piece, it compares the recorded checksum to the actual checksum of the received piece to make sure that it is error-free. Peers that provide the complete file are called "seeders," and the peer providing the initial copy is called the "initial seeder."

The exact information contained in the torrent file depends on the version of the BitTorrent protocol. By convention, the name of a torrent file has the suffix ".torrent". Torrent files contain an "announce" section, which specifies the URL of the tracker, and an "info" section, which contains (suggested) names for the files, their lengths, the piece length used, and an SHA-1 hash code for each piece, which clients should use to verify the integrity of the data they receive.

In practice, the peer places a link to the file on a website or elsewhere, and registers it with a tracker. The tracker maintains lists of the clients currently participating in the torrent. Alternatively, in a "trackerless" system (decentralized tracking) every peer acts as a tracker, broadcasting to the other peers that it is participating in the torrent. Trackerless BitTorrent is currently implemented by BitTorrent, "µTorrent", "BitComment", and "K.Torrent" clients through the distributed hash table (DHT) method. Other trackerless clients, such as the "Azureus" client, are also known and may operate in other ways.

As additionally explained by Wikipedia, a user typically browses the web to find a torrent file of interest, downloads the torrent file and then and opens it with a BitTorrent client program. The client then connects to the tracker specified in the torrent file, which then sends it a list of other peers currently downloading pieces of the file to be downloaded, and the client then connects to those peers to obtain the various pieces. Such a group of peers connected to each other to share a torrent is called a "swarm." If the swarm contains only the initial seeder, the client connects directly to it and begins to request pieces. As peers enter the swarm, they begin to trade pieces with one another, instead of downloading directly from the seeder.

Further, the clients in a swarm generally incorporate mechanisms to optimize their download and upload rates. For example, they may download pieces in a random order, to increase the opportunity to exchange data, which is only possible if two peers have different pieces of the file. Still further, BitTorrent may implement a mechanism called "optimistic unchoking," by which each client reserves a portion of its available bandwidth for sending pieces to random peers (not necessarily known-good partners or so called preferred peers), in hopes of discovering even better partners and to ensure that newcomers get a chance to join the swarm.

As still further explained by Wikipedia, a BitTorrent download differs from a classic full-file HTTP request in several fundamental ways. First, BitTorrent makes many small P2P requests over different TCP sockets, while web browsers typically make a single HTTP GET request over a single TCP socket. Second, BitTorrent typically downloads in a random or "rarest-first" approach that ensures high availability, while HTTP downloads in a contiguous manner.

Taken together, according to Wikipedia, BitTorrent achieves much lower cost, much higher redundancy, and much greater resistance to abuse or "flash crowds" than a regular HTTP server. However, this protection comes at a cost: downloads take time to ramp up to full speed because these many peer connections take time to establish, and it takes time for a node to get sufficient data to become an effective uploader. As such, a typical BitTorrent download will gradually ramp up to very high speeds, and then slowly ramp back down toward the end of the download. This contrasts with an HTTP server that, while more vulnerable to overload and abuse, ramps up to full speed very quickly and maintains this speed throughout.

The preferred embodiment of the invention makes novel use of cooperative downloading such as BitTorrent to facilitate distribution of digital motion picture content from production companies to theaters via terrestrial wireless transmission. For simplicity, and without loss of generality, the remainder of this discussion will refer to BitTorrent as the cooperative download mechanism. However, it should be understood that other cooperative downloading (or, more generally, peer-to-peer downloading) mechanisms could be used instead or in addition.

In accordance with the preferred embodiment, each theater's media agent 46 will run a BitTorrent client and will thus function as a peer and ultimately as a BitTorrent swami member, and the wireless service provider's media controller 22 will control operation of each theater's BitTorrent client.

Figure 3:
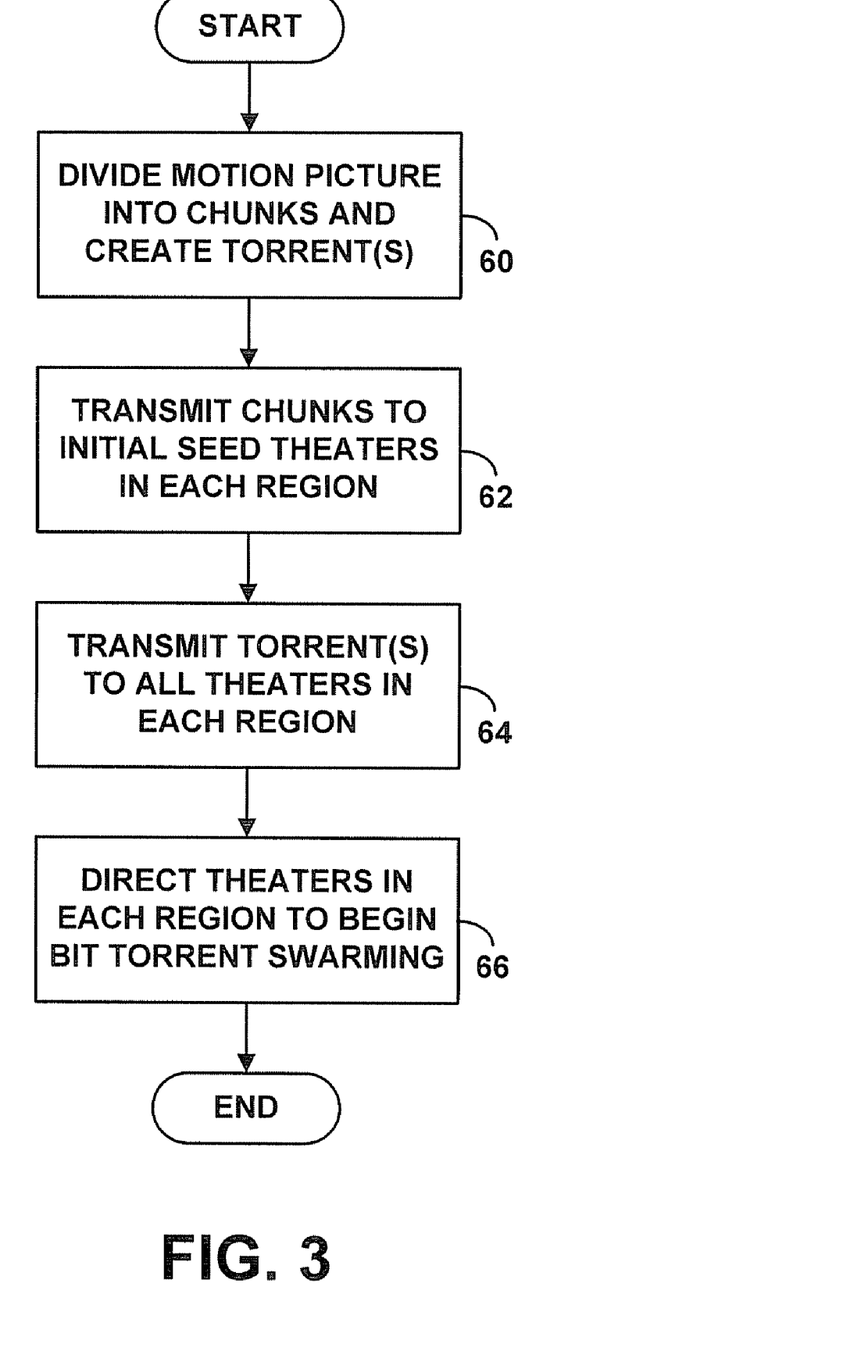
FIG. 3 is a flow chart depicting functions that can be carried out in accordance with the exemplary embodiment.

FIG. 3 is a flow chart depicting functions that may be carried out in accordance with the preferred embodiment, to distribute a motion picture to multiple theaters. As shown in FIG. 3, at step 60, a wireless service provider will preferably divide the motion picture into several chunks (if the motion picture is not so divided already) and will establish at least one torrent file for the chunks (e.g., one torrent file for the entire motion picture, or one for each chunk of the motion picture), such that each chunk can be distributed with BitTorrent to the multiple theaters. At step 62, the wireless service provider will then strategically push or otherwise transmit the motion picture chunks via the service provider's wireless networks to particular theaters in a given region, so that those particular theaters will become initial seeders or "initial seed theaters" of those chunks for their region. Further, at step 64, the wireless service provider will transmit to each of the theaters in the region the at least one torrent file for the motion picture. And at step 66, the wireless service provider will then direct all of the theaters in the region to begin BitTorrent swarming, so that all of the pieces or bits will be distributed from the initial seed theaters to all of the theaters in the region, thereby providing each theater with each chunk of the motion picture.

Figure 4:
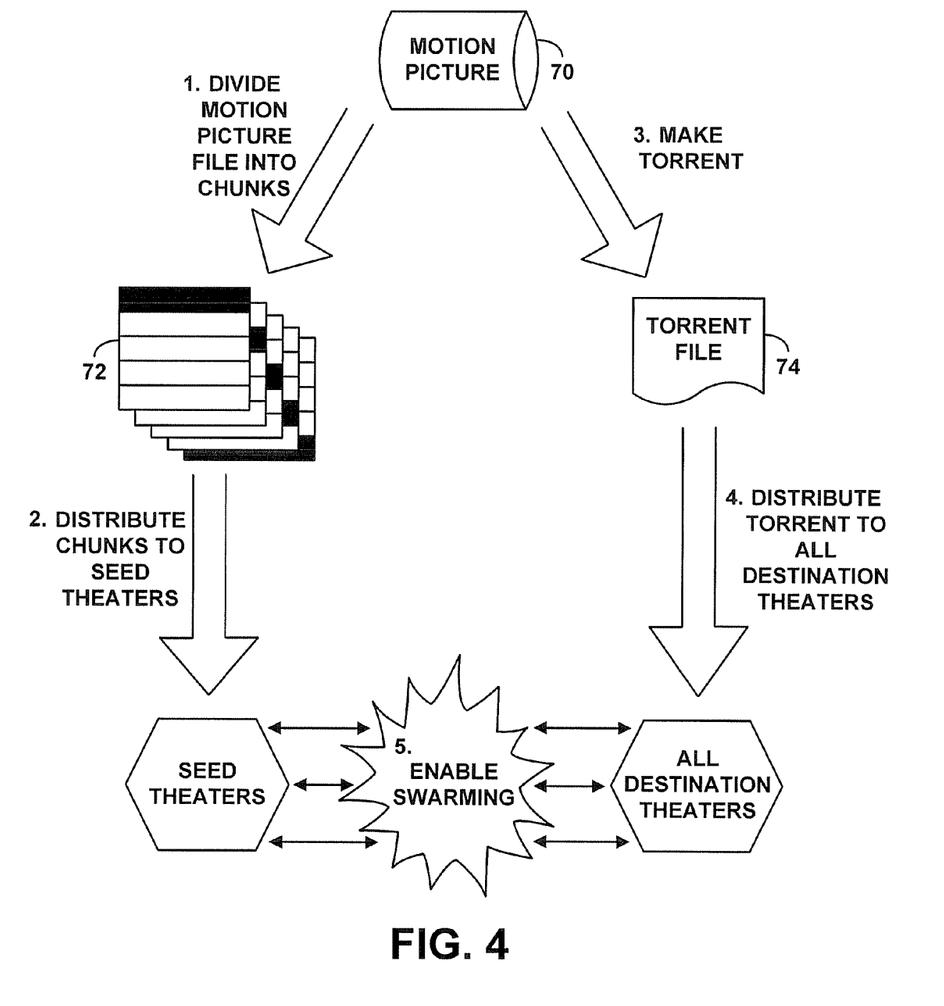
FIG. 4 is a flow diagram depicting content and torrent flow within the exemplary embodiment.

FIG. 4 is, in turn, a flow diagram graphically depicting content and torrent flow within the preferred embodiment. The flow diagram of FIG. 4 begins at the top with a motion picture 70 that is to be distributed to multiple theaters. In accordance with the preferred embodiment, a distributor of the motion picture divides the motion picture into chunks, producing chunks 72, and distributes the chunks to various initial seed theaters. Further, the distributor produces at least one torrent 74 for the motion picture and distributes the torrent to all of the theaters that are to ultimately receive the motion picture, including the initial seed theaters. The distributor then enables swarming among the theaters, to facilitate cooperative distribution of all of the chunks to all of the theaters, and thus to facilitate ultimate distribution of the motion picture to all of the theaters.

In the preferred embodiment, these functions may be conducted or orchestrated by media controller 22, through execution of program logic stored in data storage of the media controller. In particular, as noted above, the media controller 22 may store the various chunks in databases 26 and may then transmit, or direct transmission of, the chunks from the databases via the wireless networks to particular seed theaters. The media controller 22 may then send to each theater's media agent 46 one or more torrent files for the motion picture, and the media controller 22 may then send management commands to the various media agents 46, directing the media agents to begin BitTorrent swarming with each other.

The chunks into which the motion picture is divided at step 60 may correspond with the "reels" into which the motion picture would be divided had it been distributed on film or on hard drives. Alternatively, the chunks can be other sizes. Further, a motion picture can be divided into any desired number of chunks.

Optimally, the selection of particular theaters in a region to be initial seed theaters for chunks of a motion picture at step 62 can take into account where those theaters are located in relation to other theaters in the region. For instance, it might be best to seed the motion picture chunks at theaters that are centrally located in relation to other theaters and that have high quality (e.g., high bandwidth) communication links with the other theaters in the region or are located close to the wired backbone network 12. On the other hand, it might be worthwhile to have initial seed theaters be positioned more evenly throughout the region, so as to more evenly distribute the BitTorrent transmissions during swarming among the theaters. Other factors may be taken into consideration as well. Furthermore, it is possible to seed one theater with more than one chunk (but preferably not all chunks) of a motion picture, and it is possible to seed multiple theaters in a region with the same chunk of a motion picture.

Further, the wireless service provider may convey the motion picture chunks to the initial seed theaters through any transmission process now known or later developed. For example, the wireless service provider may convey the motion picture chunks to initial seed theaters in various regions using IP-multicast, such the well known UDPcast file transfer tool that operates to send data simultaneously to multiple destinations on a network. As another example, the wireless service provider may store each chunk at a respective network location and then send to each initial seed theater an MMS message, WAP Push message or the like that directs the theater to download a particular chunk from that location, and the theater may responsively download that chunk from the designated network location using FTP, HTTP, or any other protocol. As still another example, each initial seed theater's media agent may include an FTP, Secure Copy (SCP), UDPCast, HS/LINK, or Media Dispatch Protocol (MDP) service (each of which is well known in the art), and the wireless service provider's media controller may send the necessary motion picture chunks to the initial seed theaters' media agents, also possibly using FTP, HTTP, UDPCast, HS/LINK, MDP, or another protocol. And as yet another example, the wireless service provider can distribute the chunks to the initial seed theaters using BitTorrent or another cooperative downloading process, such as by storing the chunks in network 12, and pushing torrents to the media agents of the seed theater and directing the media agents to begin swarming so as to ultimately receive the chunks.

One issue that a wireless service provider may face when initially seeding theaters with motion picture chunks, however, is that limited bandwidth may be available for transmission of those chunks through wireless communication links to the initial seed theaters.

As is well known in the art, for instance, the air interface link between radio nodes 44 (or between a serving base station and a client station in other arrangements) has limited bandwidth. By engineering design, a portion of that limited bandwidth may be set aside for use to carry downlink communications (toward a served client device), and the remainder of the bandwidth will be set aside for use to carry uplink communications (from the client device). In some systems, the available bandwidth may be shared substantially equally between the downlink and the uplink, which means that only half of the total available bandwidth would be available for downlink transmissions, to the theaters in this instance. In other systems, the available bandwidth may be allocated asymmetrically between the downlink and the uplink (typically with higher bandwidth on the downlink than the uplink). Nevertheless, the limited bandwidth available on the downlink of a typical wireless link can hinder the transmission of large data files, such as certain motion picture chunks for instance.

As a novel approach to help overcome this bandwidth problem, according to the present invention, the wireless service provider may dynamically adjust the bandwidth allocation on one or more wireless links leading to the initial seed theaters, in order to increase the downlink bandwidth during the initial seeding process, and the wireless service provider may then restore the bandwidth allocations to allow for optimal peer-to-peer sharing of chunks among the theaters in the region after the seeding process is complete.

As presently contemplated, the media controller 22 operated by the wireless service provider may orchestrate these bandwidth allocations (and thus, the wireless service provider may orchestrate these bandwidth allocations), by signaling to various network elements of the wireless network 16, such as various radio nodes 20, RNCs, BTSs, and/or other elements. For instance, in the mesh network configuration shown in FIG. 1, the media controller 22 may signal to some or all of the radio nodes to direct each radio node to increase downlink bandwidth and, if necessary, to correspondingly decrease uplink bandwidth. In this regard, the media controller 22 preferably has a record of the topology of wireless network 16 and can therefore determine programmatically (or be programmed in advance to know) which directional links should have bandwidth increased.

For instance, given a pair of radio nodes A and B, if a motion picture chunk would flow from node A to node B on its way to a seed theater, the media controller 22 may direct node A to increase its air interface bandwidth (bit rate, and/or other air interface resources such as power, frequency usage, or the like) for transmissions to node B. Node A may then responsively increase its bandwidth for transmissions to node B, and possibly decrease its bandwidth for transmissions from node B. Further, node A may responsively signal to node B to notify node B of the change and allow node B to programmatically make corresponding changes in its bandwidth allocation. Alternatively, media controller 22 may signal to node B, and node B may take action accordingly and notify node A. Still alternatively media controller 22 may signal to both nodes A and B.

Thus, in the preferred embodiment, just before the media controller 22 is ready to transmit the chunks (or to orchestrate transmission of the chunks) to the initial seed theaters, the media controller will send SNMP or other bandwidth-adjustment commands via the core network 12 to the radio nodes 20 and/or other elements of wireless network 16, so as to adjust the bandwidth allocation on one or more wireless links leading to the initial seed theaters, so as to increase the downlink bandwidth and, if necessary, to correspondingly decrease the uplink bandwidth on each link.

For example, if a given radio node pair normally allocates its air interface bandwidth equally between the downlink and the uplink, the media controller may adjust the bandwidth allocation to increase the downlink bandwidth (toward the initial seed theaters) to 90% and to decrease the uplink bandwidth to 10%. And as another example, if a given pair normally allocates 70% of the air interface bandwidth to the downlink and 30% of the air interface bandwidth to the uplink, the media controller could adjust the bandwidth allocation to increase the downlink bandwidth to 95% and to decrease the uplink bandwidth to 5%. The extent of increase in downlink bandwidth is a matter of design choice.

In turn, once the media controller 22 finishes transmitting the chunks to the initial seed theaters (e.g., once the initial seed theaters send acknowledgements indicating that they have received chunks sent to them), the media controller will preferably restore each adjusted bandwidth allocation to its normal state, or will at least lower the downlink bandwidth from its increased level, such as by sending another SNMP-command for instance. By way of example, if the media controller had adjusted a 50/50 bandwidth allocation to be 90/10, the media controller may then adjust the bandwidth allocation back to 50/50. And if the media controller had adjusted a 70/30 bandwidth allocation to 95/5, the media controller may then adjust the bandwidth allocation back to 70/30.

In a particularly preferred embodiment, however, once the initial theater seeding is complete, the media controller will adjust the bandwidth allocation in some or all of the wireless links in the region to be substantially a 50/50 allocation, so that an equal (or nearly equal) amount of bandwidth will be available in each link for use in transmissions to and from theaters in the region. The media controller may do this in each wireless link having limited bandwidth, such as each last-mile link to the theaters in the regions, and the wireless service provider may forego doing so in any especially-high bandwidth links such as Gigabit links for instance. In any event, this substantial equalization of bandwidth bi-directionally in each wireless link will work best to support peer-to-peer sharing of the motion picture chunks among the theaters in the region, once the sharing process begins.

(It should also be noted that this dynamic bandwidth adjustment can be used as well on wireline or non-terrestrial wireless links having limited bandwidth. For instance, if the wireless network 16 includes such links, the media controller 22 can send SNMP or other control commands to the entities governing or providing those links, in order to increase downlink transmission bandwidth before chunk seeding begins, and then to roughly equalize downlink and uplink transmission bandwidth once chunk seeding is complete.)

Note also that, in an alternative embodiment, the wireless service provider can provide the chunks of the motion picture to the initial seed theaters in other ways as well. For instance, the wireless service provider can deliver the chunks on hard drives via courier delivery to the various seed theaters, and technicians at the seed theaters can couple the hard drives with the media agents at the seed theaters. Other examples are possible as well.

As noted above, at step 64 in FIG. 3, the wireless service provider will further transmit to each of the theaters in the region at least one torrent file for the motion picture. For instance, media controller 22 may transmit to each theater in the region a single torrent file that lists the pieces of all of the chunks of the motion picture. Alternatively, media controller 22 may transmit to each theater in the region a set of torrent files, with each torrent file of the set corresponding with one of the chunks of the motion picture. Other torrent arrangements are possible as well. Further, the media controller can transmit the torrent file(s) to the theaters' media agents in any of a variety of ways, such as FTP, SCP, UDPCast, HTTP, HS/LINK, MDP, or IP-multicast, for instance.

Once the wireless service provider completes the initial seeding process and re-adjusts the bandwidth allocations in the wireless links, the wireless service provider will then direct the theaters in the region to begin peer-to-peer distribution of the motion picture chunks with each other at step 66. As presently contemplated, this can be done using a trackerless BitTorrent process, in order to avoid the need for use of a centralized tracker. Alternatively, the process could use a tracker or could use some other form of peer-to-peer file distribution altogether.

As noted above, in a trackerless BitTorrent system, each peer broadcasts its participation and the availability of content pieces for downloading by others. To facilitate initial seeding of theaters in each region in accordance with the exemplary embodiment, however, the wireless service provider may first direct the theaters (at least the initial seed theaters) to turn off their broadcasting functions. For instance, the media controller 22 may send SNMP-based commands to the media agents, directing them to turn off their BitTorrent broadcasting functions. Once the media controller finishes the initial seeding process, the media controller may then direct all of the theater media agents to turn on their broadcasting functions, so as to thereby start the peer-to-peer sharing/distribution process.

Once the BitTorrent process starts, it is expected that the distribution of the chunks from the initial seed theaters to the various other theaters in the region will occur relatively quickly, since each theater's BitTorrent client will be operating as a friendly BitTorrent client, making pieces available to other theaters' BitTorrent clients, while downloading pieces from other theaters' BitTorrent clients. Further, to the extent the theaters in the region communicate with each other over high data rate wireless links such point-to-point microwave or millimeter wave links for instance, each piece should pass relatively quickly between the theaters. Still further, if this process is implemented for a small enough region, the end-to-end transmission delay between theaters communicating via the wireless serving system should be minimal.

In summary, an exemplary embodiment of the present invention may take the form of a method of distributing a motion picture to a plurality of theaters where the motion picture will be presented to audiences. The exemplary method may involve (i) distributing chunks of the motion picture to just a subset of the theaters, so that each theater to which a chunk is distributed becomes a seed theater for that chunk, and (ii) directing the plurality of theaters share the chunks among each other via a communication network, so that all of the theaters ultimately receive all of the chunks of the motion picture.

More particularly, where the motion picture is to be distributed to the theaters via wireless communication links having limited bandwidth, the method may involve, in order, (a) increasing downlink bandwidth in the wireless communication links leading to initial seed theaters, (b) transmitting chunks of the motion picture via the wireless communication links to the initial seed theaters, (c) decreasing the downlink bandwidth in the wireless communication links, and (d) directing the theaters to share the chunks among each other, so that all of the theaters receive all of the chunks of the motion picture.

In this method, the act of increasing the downlink bandwidth in the wireless communication link may involve sending a signaling message to at least one radio network element that controls the bandwidth, such as an intelligent radio node, RNC, or BTS, for instance, directing the at least one radio network element to increase the downlink bandwidth, and having the element responsively increase the downlink bandwidth. Further, in a wireless communication link that shares its limited bandwidth between downlink and uplink communications, the act of increasing the downlink bandwidth in the wireless communication link may involve correspondingly decreasing uplink bandwidth in the wireless communication link.

The act of transmitting the chunks of the motion picture via the wireless communication links may then involve transmitting the chunks via a wireless service provider's core packet data network and through one or more radio access networks to the initial seed theaters. The transmission may occur through a protocol such as UDPCast, FTP, HTTP, HS/LINK, MDP, or BitTorrent for instance, or in accordance with some other protocol.

The act of decreasing the downlink bandwidth on the wireless communication links may then involve restoring bandwidth allocations on the wireless communication links to their states before the downlink bandwidth was increased. Alternatively or additionally, the act of decreasing the downlink bandwidth on a given wireless communication link may involve substantially equalizing downlink bandwidth and uplink bandwidth on the wireless communication link, to aid in sharing of the chunks among the theaters via the wireless communication links.

The act of directing the theaters to share the chunks among each other so that all of the theaters receive all of the chunks of the motion picture may comprise directing the theaters to begin BitTorrent swarming with each other, to share the chunks in pieces with each other. By way of example, the act may involve sending control signals to BitTorrent clients running at each theater, to direct each BitTorrent client to turn on a BitTorrent broadcast function so that the BitTorrent clients at the other theaters can learn what pieces of the chunks the various theaters have available to share with other theaters' BitTorrent clients. In that case, each client may apply a trackerless BitTorrent protocol. Further, before transmitting the chunks of the motion picture to the initial seed theaters, the method may further involve directing the BitTorrent client at each theater to turn off its BitTorrent broadcast function, so that the sharing of chunks among the theaters does not begin until completion of transmission of the chunks to the initial seed theaters.

Where BitTorrent is used as the sharing mechanism, the method may further involve sending to each of the theaters at least one torrent file for the motion picture, such as a torrent file for each chunk of the motion picture for instance. The torrent file preferably identifies pieces of each chunk, so as to facilitate transfer of the pieces among the various theaters.

The exemplary method may be carried out respectively in each of multiple geographic regions, such as in particular regions of the United States for instance. That way, the method can facilitate distribution of the motion picture to multiple theaters in each of the multiple regions, thus ultimately facilitating widespread distribution of the motion picture throughout the United States or other area for instance.

In another respect, the exemplary embodiment may take the form of a method for distributing a motion picture to multiple theaters in a region. The exemplary method may involve: (a) at a media controller, dividing the motion picture into multiple chunks, (b) through control signaling between the media controller and one or more initial seed theaters in the region, turning off cooperative-download broadcasting at each initial seed theater, (c) through control signaling between the media controller and one or more radio access network elements, increasing a downlink bandwidth allocation on each of one or more wireless links through which content would flow from the media controller to the one or more initial seed theaters, (d) transmitting the chunks from the media controller to particular initial seed theaters in the region, (e) after transmitting the chunks to the initial seed theaters, reducing each increased downlink bandwidth allocation in favor of a corresponding increase in uplink bandwidth allocation, (f) distributing one or more torrent files for the motion picture to each of the theaters in the region, and (g) turning back on the cooperative download broadcasting at each of the one or more initial seed theaters in the region, to begin sharing of the chunks among the theaters in the region.

At that point, the initial seed theaters will broadcast their participation in the downloading process and availability of pieces of their chunks for download, and the various theaters will engage in a BitTorrent or other peer-to-peer file sharing process to distribute the various pieces of the chunks among each other, culminating in ultimate receipt of each chunk by each theater in the region. A computerized management system at each theater may then store the received chunks in data storage, possibly combining them together as a single motion picture file for playout.

Optimally, a wireless service provider that operates one or more of the wireless links leading to the various theaters will carry out this method on a region-by-region basis. In practice, the wireless service provider can thus function as a motion picture distributor, providing motion picture studios and post-production houses with a substantially improved distribution channel.

Furthermore, an entity other than a wireless service provider can carry out the inventive process, or portions of the inventive process. However, it is expected that some interaction with the wireless service provider would be required, at a minimum to facilitate control of the bandwidth allocations on wireless links extending to the initial seed theaters.

It should also be understood that the invention can be applied with respect to distribution of other types of content and to the distribution of content to other types of entities aside from theaters. For example, the invention can take the form of a method for distributing content to multiple entities in a region via wireless communication links having limited bandwidth. The method may then involve, in order, (a) increasing downlink bandwidth in the wireless communication links leading to initial seed entities, (b) transmitting chunks of the content via the wireless communication links to the initial seed entities, (c) decreasing the downlink bandwidth in the wireless communication links, and (d) directing the entities to share the chunks among each other, so that all of the entities receive all of the chunks of the content. Further, the invention can involve transmitting other sorts of media content, aside from motion picture content, to theaters.

Numerous other variations may be possible as well.

We claim:

1. A method of distributing a motion picture to multiple theaters in a region via wireless communication links having limited bandwidth, the method comprising, in order:

increasing downlink bandwidth in the wireless communication links leading to initial seed theaters;

transmitting chunks of the motion picture via the wireless communication links to the initial seed theaters;

decreasing the downlink bandwidth in the wireless communication links; and directing the theaters to share the chunks among each other, so that all of the theaters receive all of the chunks of the motion picture, wherein directing the theaters to share the chunks among each other so that all of the theaters receive all of the chunks of the motion picture comprises directing the theaters to begin BitTorrent swarming with each other, to share the chunks in pieces with each other wherein each theater has a computer system with a BitTorrent client, and wherein directing the theaters to begin BitTorrent swarming with each other comprises sending to each theater a control signal directing the BitTorrent client at the theater to turn on a BitTorrent broadcast function, so that the BitTorrent clients at the other theaters can then learn what pieces of the chunks are available to obtain from other theaters' BitTorrent clients.

2. The method of claim 1, wherein increasing the downlink bandwidth in the wireless communication links comprises:

sending a signaling message to at least one radio network element that controls the downlink bandwidth, directing the at least one radio network element to increase the downlink bandwidth.

3. The method of claim 2, wherein increasing the downlink bandwidth in the wireless communication links further comprises:

receiving the signaling message at the at least one radio network element and responsively increasing the downlink bandwidth in at least wireless communication controlled by the radio network element.

4. The method of claim 3, wherein the at least one radio network element comprises an element selected from the group consisting of a peer-to-peer radio node, a base transceiver station, and a radio network controller.

5. The method of claim 1,
wherein each of the wireless communication links shares its limited bandwidth between downlink and uplink communications, and
wherein increasing the downlink bandwidth in a wireless communication link comprises correspondingly decreasing uplink bandwidth in the wireless communication link.

6. The method of claim 1, wherein transmitting the chunks of the motion picture via the wireless communication links to the initial seed theaters comprises:
transmitting the chunks via a wireless service provider's core packet data network and through one or more wireless networks to the initial seed theaters.

7. The method of claim 1, wherein transmitting the chunks of the motion picture to the initial seed theaters comprises:
transmitting the chunks to the initial seed theaters according to a protocol selected from the group consisting of UDPCast, Secure Copy (SCP), File Transfer Protocol (FTP), Hypertext Transfer Protocol (HTTP), HS/LINK, Media Dispatch Protocol (MDP), and BitTorrent.

8. The method of claim 1, wherein decreasing the downlink bandwidth on the wireless communication links comprises:
restoring bandwidth allocations on the wireless communication links to states of the allocations before the downlink bandwidth was increased.

9. The method of claim 1, wherein decreasing the downlink bandwidth on a given wireless communication link comprises:
substantially equalizing downlink bandwidth and uplink bandwidth on the given wireless communication link, to aid in sharing of the chunks among the theaters via the wireless communication links.

10. The method of claim 1, wherein directing the theaters to begin BitTorrent swarming with each other comprises:
sending to each theater a control signal directing the theater's BitTorrent client to begin swarming.

11. The method of claim 1, further comprising:
before transmitting the chunks of the motion picture to the initial seed theaters, directing the BitTorrent client at each initial seed theater to turn off BitTorrent broadcasting, so that the sharing of chunks among the theaters does not begin until completion of transmission of the chunks to the initial seed theaters.

12. The method of claim 1, further comprising:
sending to each of the theaters at least one torrent file for the motion picture, the at least one torrent file identifying pieces of each chunk, to aid in sharing of the pieces among theaters.

13. The method of claim 1, further comprising carrying out the method in each of multiple geographic regions, to facilitate distribution of the motion picture to theaters in each of the multiple regions.

14. A method of distributing a motion picture to multiple theaters in a region, the method comprising:
at a media controller, dividing the motion picture into multiple chunks;
through control signaling between the media controller and one or more initial seed theaters in the region, turning off cooperative-download broadcasting at each initial seed theater;
through control signaling between the media controller and one or more radio access network elements, increasing a downlink bandwidth allocation on each of one or more wireless links through which content would flow from the media controller to the one or more initial seed theaters;
transmitting the chunks from the media controller to particular initial seed theaters in the region;
after transmitting the chunks to the initial seed theaters, reducing each increased downlink bandwidth allocation in favor of a corresponding increase in uplink bandwidth allocation;
distributing at least one torrent file for the chunks to each of the theaters in the region; and
turning back on the cooperative download-broadcasting at each of the one or more initial seed theaters in the region, to begin sharing of the chunks among the theaters in the region,
whereby the initial seed theaters then broadcast their participation in the downloading process and availability of pieces of their chunks for download, and the theaters share the chunks with each other, so that each theater ultimately receives each chunk.

15. The method of claim 14, further comprising a wireless service provider that operates one or more of the wireless links leading to the various theaters carrying out the method.

16. A method of distributing content to multiple entities in a region via wireless communication links having limited bandwidth, the method comprising, in order:
increasing downlink bandwidth in the wireless communication links leading to initial seed entities;
transmitting chunks of the motion picture via the wireless communication links to the initial seed entities;
decreasing the downlink bandwidth in the wireless communication links; and
directing the entities to share the chunks among each other, so that all of the entities receive all of the chunks of the content,
wherein directing the entities to share the chunks among each other so that all of the entities receive all of the chunks of the content comprises directing the entities to begin BitTorrent swarming with each other, to share the chunks in pieces with each other,
wherein each entity has a computer system with a BitTorrent client, wherein the method further comprises before transmitting the chunks of the motion picture to the initial seed entities, directing the BitTorrent client at each initial seed entity to turn off BitTorrent broadcasting, so that the sharing of chunks among the entities does not begin until completion of transmission of the chunks to the initial seed entities, and
wherein directing the entities to begin BitTorrent swarming with each other comprises sending to each entity a control signal directing the BitTorrent client at the entity to turn on BitTorrent broadcasting, so that the BitTorrent clients at the other entities can then learn what pieces of the chunks are available to obtain from other entities' BitTorrent clients.

17. A method of distributing a motion picture from a media server to a plurality of theaters where the motion picture will be presented to audiences, wherein each theater has a cooperative download client, the method comprising, in order:
the media server distributing chunks of the motion picture to just a subset of the theaters, wherein each theater to which a chunk is distributed becomes a seed theater for that chunk;

before transmitting the chunks of the motion picture to the initial seed theaters, the media server directing the cooperative download client at each initial seed theater to turn off cooperative download broadcasting, so that the sharing of chunks among the theaters does not begin until completion of transmission of the chunks to the initial seed theaters;

the media server directing the plurality of theaters to share the chunks among each other via a communication network, so that all of the theaters ultimately receive all of the chunks of the motion picture, wherein directing the plurality of theaters to share the chunks among each other so that all of the theaters receive all of the chunks of the motion picture comprises sending to each theater a control signal directing the cooperative download client at the theater to turn on cooperative download broadcasting, so that the cooperative download clients at the other theaters can then learn what pieces of the chunks are available to obtain from other theaters' cooperative download clients.

\* \* \* \* \*